United States Patent [19]

Miaskoff

[11] Patent Number: 4,536,119

[45] Date of Patent: Aug. 20, 1985

[54] PALLETIZING APPARATUS WITH LAYER LEVEL DETECTING MEANS

[75] Inventor: Leonard Miaskoff, Plattsburgh, N.Y.

[73] Assignee: Harris Corporation, Melbourne, Fla.

[21] Appl. No.: 425,611

[22] Filed: Sep. 28, 1982

[51] Int. Cl.³ .............................................. B65G 57/06
[52] U.S. Cl. ..................... 414/100; 271/215;
271/217; 271/220; 414/82; 414/907
[58] Field of Search ................. 414/100, 76, 82, 907;
271/220, 215, 217

[56] References Cited

U.S. PATENT DOCUMENTS

| | | | |
|---|---|---|---|
| 3,126,657 | 3/1964 | Hajos | 414/907 X |
| 3,164,080 | 1/1965 | Miller, Jr. | 414/82 X |
| 3,737,051 | 6/1973 | Horino | 414/28 |
| 4,024,965 | 5/1977 | Marth et al. | 414/82 X |
| 4,132,321 | 1/1979 | Bowlby et al. | 493/8 |
| 4,439,084 | 3/1984 | Werkheiser | 414/82 X |

FOREIGN PATENT DOCUMENTS

| | | |
|---|---|---|
| 1215591 | 4/1966 | Fed. Rep. of Germany . |
| 116189 | 11/1975 | Fed. Rep. of Germany . |
| 2635057 | 2/1978 | Fed. Rep. of Germany . |
| 1162582 | 3/1967 | United Kingdom . |
| 1569171 | 10/1976 | United Kingdom . |
| 1472664 | 5/1977 | United Kingdom . |

Primary Examiner—Robert J. Spar
Assistant Examiner—Janice Krizek
Attorney, Agent, or Firm—Yount & Tarolli

[57] ABSTRACT

An improved palletizing apparatus sequentially loads a plurality of layers of bundles of newspapers onto a pallet. The apparatus includes a layer position and sheet hold down assembly which (1) indicates the level of the uppermost layer of bundles in a stack of bundles on a pallet and (2) holds down pages of the newspaper at the top of the bundles. During operation of the palletizing apparatus, a layer of bundles is moved onto a retractable floor disposed above a pallet. The floor is then opened and the layer of bundles is dropped onto the pallet. An elevator is then operated to lower the pallet. The layer position and sheet hold down assembly indicates when the upper layer of bundles has been moved a predetermined distance beneath the floor so that the floor can close without interference with the stack of bundles. The layer position and sheet hold down assembly includes a frame which engages the top of the layer of bundles and a linkage which maintains the frame in a horizontal orientation. The frame holds down the uppermost sheets in the layer of bundles and urges the bundles into a desired spatial relationship relative to each other.

5 Claims, 7 Drawing Figures

PALLETIZING APPARATUS WITH LAYER LEVEL DETECTING MEANS

BACKGROUND OF THE INVENTION

The present invention relates to a new and improved apparatus for sequentially loading a plurality of layers of bundles of newspapers onto a pallet.

A known apparatus for sequentially loading layers of bundles of newspapers onto a pallet is disclosed in U.S. patent application Ser. No. 335,839 filed Dec. 30, 1981, U.S. Pat. No. 4,439,084, by James S. Werkheiser and entitled "Palletizer for Newspaper Bundles". The apparatus disclosed in this application includes a conveyor which sequentially moves bundles to a row staging area. A row sweep moves a row of bundles from the row staging area to a layer staging area. When a layer of bundles has been accumulated at the layer staging area, a layer sweep moves the layer of bundles onto a retractable floor. The retractable floor then opens and the bundles are dropped onto a pallet disposed on an elevator immediately beneath the floor. The elevator is then lowered so that the floor can close to receive a next succeeding layer of bundles.

During operation of the known apparatus disclosed in the aforementioned Werkheiser application, it is necessary to detect when the elevator has lowered the pallet through a sufficient distance so that the uppermost layer of bundles on the pallet is just beneath the floor. To this end, a light source and photocell are positioned on opposite sides of the elevator at a location immediately beneath the floor. When the layer of bundles is dropped onto the pallet, the light beam is blocked. When the elevator has lowered the bundles to the desired level beneath the floor, the light beam just clears the layer of bundles and activates the photocell to provide a signal to a control the apparatus for the palletizer.

Although the apparatus disclosed in the aforementioned Werkheiser application is generally satisfactory in its operation, difficulty has been encountered due to false indications of the level of the top layer of bundles. The false indications of the position of the top layers of the bundles were due to sheets of paper projecting upwardly from the layer of bundles and/or one of the bundles being tilted or extending upwardly further than the other bundles in the layer. The upwardly projecting pieces of paper may block the light beam so that the elevator lowers the bundles further than necessary. If a bundle is offset to one side of the light beam and extends upwardly from the other bundles in the layer, the upwardly projecting bundle may extend into the opening in the floor even though the remainder of the bundles in the layer are clear of the opening.

SUMMARY OF THE PRESENT INVENTION

A palletizer is operable to sequentially load a plurality of layers of bundles onto a pallet. The palletizer includes a retractable floor which supports a layer of bundles over the pallet. Upon opening of the retractable floor, the layer of bundles drops onto a pallet supported by an elevator. The elevator then lowers the pallet to move the layer of bundles clear of the opening in the floor.

In accordance with the present invention, an indicator assembly engages the top of the layer of bundles and moves downwardly with the layer of bundles as it is lowered by the elevator. When the layer of bundles is a desired distance beneath the floor, a sensor provides a signal to stop the operation of the elevator. The indicator assembly includes a frame or panel which overlies each of the bundles and holds down loose sheets of material. A linkage assembly holds the frame in a generally horizontal orientation so that the level of the frame is determined by the highest portion of a layer of bundles engaged by the frame.

Accordingly, it is an object of this invention to provide a new and improved apparatus for sequentially loading a plurality of layers of bundles onto a pallet and wherein an indicator assembly engages the top of a layer of bundles and moves downwardly with the layer of bundles as it is lowered by an elevator.

Another object of this invention is to provide a new and improved apparatus for sequentially loading a plurality of bundles onto a pallet and wherein a frame overlies each bundle in a layer of bundles and a linkage assembly holds the frame in a horizontal orientation in engagement with an uppermost portion of the layer of bundles as it is lowered by an elevator.

BRIEF DESCRIPTION OF THE DRAWINGS

The foregoing and other objects and features of the present invention will become more apparent upon a consideration of the following description taken in connection with the accompanying drawings, wherein.

DESCRIPTION OF ONE SPECIFIC PREFERRED EMBODIMENT OF THE INVENTION

Figure 1:
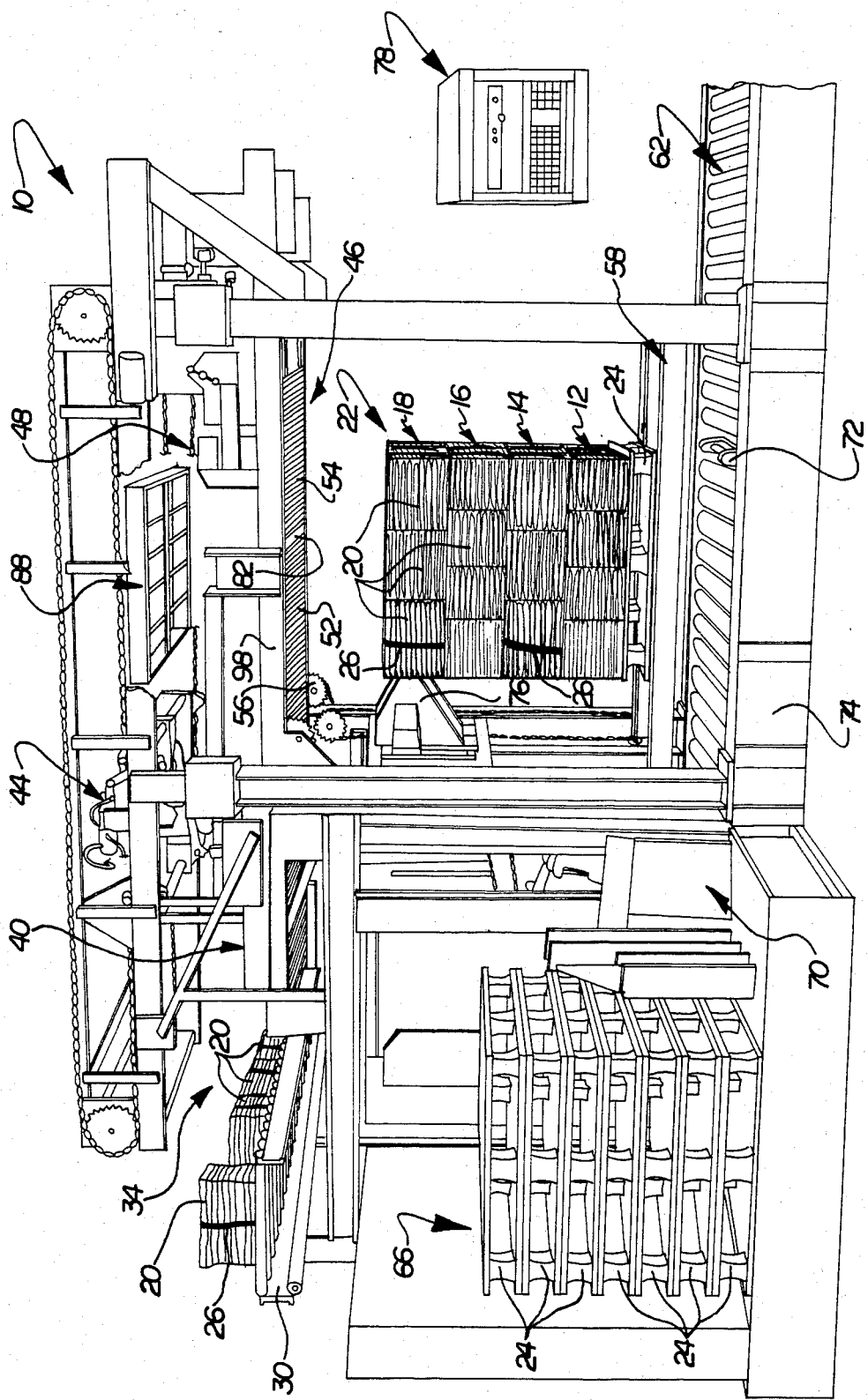
FIG. 1 is a pictorial illustration of a palletizer which sequentially loads layers of bundles onto a pallet.

A palletizer assembly 10 (FIG. 1) sequentially positions layers 12, 14, 16 and 18 of bundles 20 of newspapers in a stack 22 on a pallet 24. Each of the bundles 20 is formed of a plurality of newspapers bound together by a suitable tie or binder 26. Although the bundles 20 may be of different sizes, in one specific instance, the newspapers measured twelve inches by fifteen inches and were stacked to a height of approximately twelve inches.

The bundles 20 enter the palletizer 10 on an infeed conveyor assembly 30. Three or four of the bundles 20 are collected at a row staging area 34. A row sweep or pusher (not shown) moves the bundles 20 from the row staging area 34 to a layer staging area 40. When three or four rows of bundles have been collected at the layer staging area 40, a layer sweep 44 moves the layers of bundles onto a retractable floor 46 disposed at a transfer station 48.

The floor 46 includes left and right sections 52 and 54 which are movable by a drive assembly 56 to drop a layer of bundles 20 onto the pallet 24. Thus, the layer 12 was dropped directly onto the pallet 24 while the layers 14, 16 and 18 were sequentially dropped onto one or more layers on the pallet. Each time a layer 12, 14, 16 or 18 is dropped onto the pallet 24, an elevator 58 lowers the pallet 24 so that the uppermost layer of the stack 22 is immediately beneath the floor 46. Once the elevator 58 has lowered the stack 22 to a location beneath the floor, the sections 52 and 54 of the floor are closed to enable a next succeeding layer to be collected at the transfer station 48.

When a stack 22 of newspaper bundles 20 having a desired height has accumulated on the pallet 24, the elevator 58 lowers the pallet onto a delivery conveyor 62 leading to a discharge area. A next succeeding pallet 24 is then moved from a stack 66 of pallets by a pallet feeder 70. The pallet feeder 70 moves the next pallet onto the delivery conveyor 62 and into engagement with a pallet register 72. The elevator 58 is then moved upwardly from a lowered position in a base section 74 to raise the next succeeding pallet 24 to a position adjacent to the floor 46. As the elevator raises the pallet 24, a cam 76 engages an edge of the pallet to move it rightwardly (as viewed in FIG. 1) into alignment with the central portion of the floor 46.

A controller 78 controls the operation of the palletizer 10 to load the proper number of bundles of newspaper 20 onto each of the pallets 24 in turn. Although it is contemplated that the controller 78 could have many different constructions, in one specific instance, the controller was an EPTAK 700 manufactured by Eagle Signal, 736 Federal Street, Davenport, Iowa 52803. The general construction of the palletizer 10 and the manner in which it cooperates with the controller 78 to sequentially load a plurality of layers 12, 14, 16 and 18 of bundles onto a pallet 24 is the same as described in U.S. patent application Ser. No. 335,839, filed Dec. 30, 1981, U.S. Pat. No. 4,439,084, by James S. Werkheiser and entitled "Palletizer for Newspaper Bundles".

When the retractable floor 46 opens, the two sections 52 and 54 are separated so that an opening forms at a central portion 82 of the floor. A layer of bundles 20 which had previously been positioned on the floor 46 by the layer sweep 44 falls downwardly through a short distance onto the pallet 24. The distance which the layer of bundles falls downwardly is relatively small, perhaps half the height of a bundle, so that the orientation of the bundles in a layer is the same as it was on the floor 46 before it was retracted.

In order to move a layer of bundles 20 out of the opening in the floor 46, the elevator 58 lowers the pallet 24. When the pallet 24 is lowered, it must move downwardly through a distance sufficient to move the uppermost layer of bundles on the pallet clear of the floor 46. However, in order to minimize the distance through which the next succeeding layer must drop onto the pallet 24, it is desirable to stop the downward movement of the elevator 58 when the uppermost layer is only a short distance beneath the floor 46.

In accordance with a feature of the present invention, a layer position indicator and sheet hold down assembly 88 (see FIGS. 1 and 2) is provided to indicate the position of the top layer of bundles on the pallet 24. The indicator assembly 88 includes a rectangular frame 92 (FIG. 2) having a length and width which is approximately the same as the length and width of a layer of bundles. The frame 92 is moved into engagement with the top of a layer of bundles to indicate the position of the layer of bundles and to hold down any loose sheets which may tend to project upwardly from the layer of bundles. In addition, the frame 92 presses the bundles downwardly to urge the bundles into a desired spatial relationship relative to each other.

A linkage assembly 96 holds the frame 92 in a horizontal orientation. Therefore if a portion of a layer of bundles should be projecting upwardly, the frame 92 will engage this uppermost portion of the layer of bundles and be held in a horizontal orientation by the linkage 96 at a level which is the same as the level of the uppermost portion of the layer of bundles. In order to provide an indication of the position of the indicator frame 92 relative to a base frame 98 of the palletizer 10, a reflector 102 is mounted on the frame 92.

During operation of the palletizer 10 (FIG. 1), the layers 12, 14, 16 and 18 of bundles 20 of newspapers are sequentially loaded onto the pallet 24. Assuming that the layer 16 of bundles has been loaded onto the pallet 24 and that the next succeeding layer 18 is to be loaded, the layer 18 is pushed from the layer staging area 40 to the transfer area 48 by the layer sweep 44 (see FIG. 1). At the transfer area 48, the layer 18 of bundles 20 is disposed on the retractable floor 46.

Figure 3:
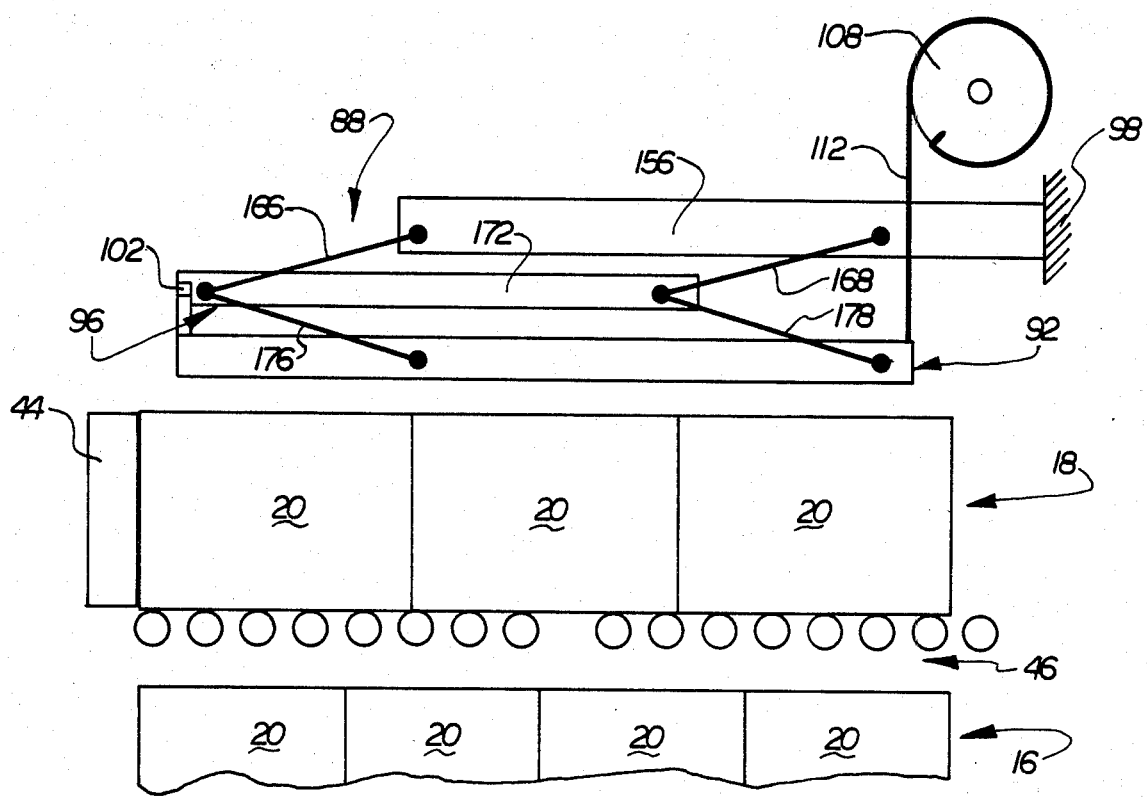
FIG. 3 is a schematic illustration depicting the relationship between the indicator assembly of FIG. 2 and a layer of bundles when the indicator assembly is in a raised position and the layer of bundles is being positioned on a retractable floor.

When the layer of bundles 18 is moved onto the retractable floor 46 by the layer sweep 44, the indicator assembly 88 is in a fully raised or retracted position illustrated schematically in FIG. 3. When the indicator assembly 88 is in the fully raised position, the frame 92 is disposed above the floor 46 for a sufficient distance to enable the layer 18 of bundles to be moved into the space beneath the frame 92 by the layer sweep 44.

Figure 4:
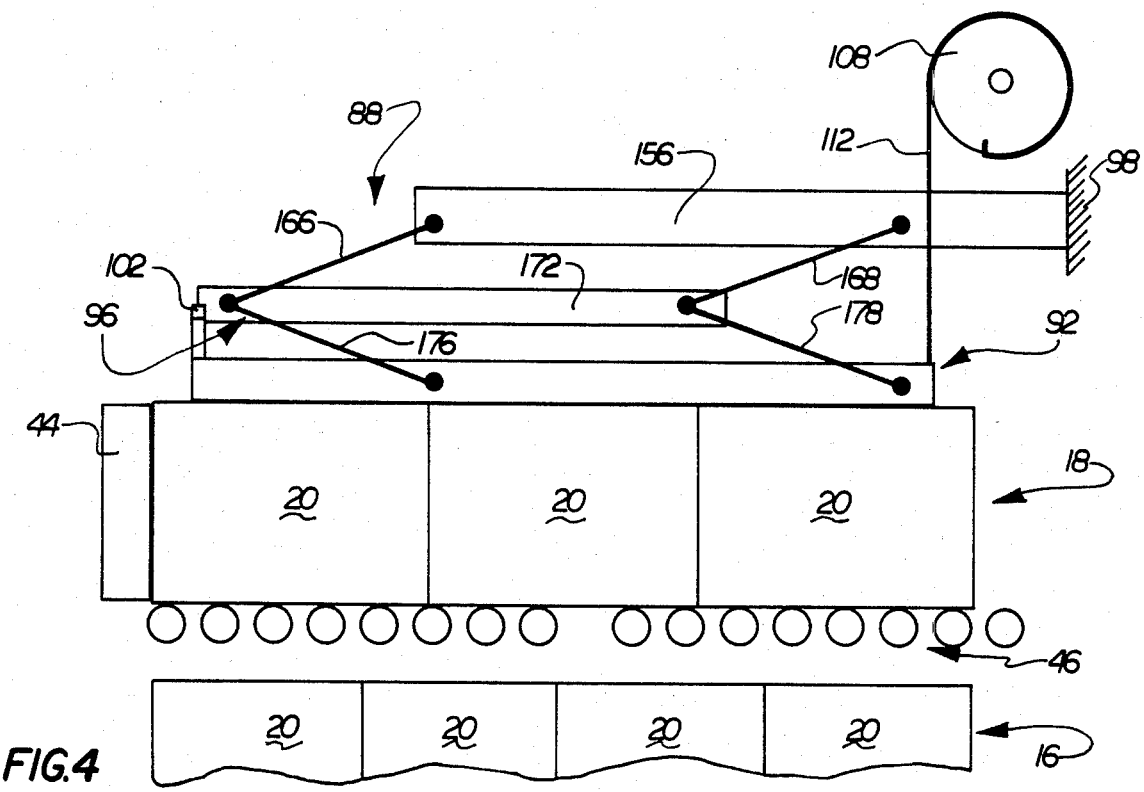
FIG. 4 is a schematic illustration, generally similar to FIG. 3, illustrating the indicator assembly in a partially lowered position engaging a layer of bundles disposed on the retractable floor.

Shortly before the layer 18 is to be dropped from the floor 46 onto the pallet 24, the frame 92 of the indicator assembly 88 is dropped onto the top of the layer (FIG. 4). To accomplish this, a clutch 106 (FIG. 2) is disengaged. Disengagement of the clutch 106 allows a sprocket 108 and shaft 110 to be rotated by a downward force applied against a chain 112 by the weight of the frame 92. The lower end of the chain 112 is fixedly connected to the frame 92. The upper end of the chain 112 is fixedly connected to the sprocket 108. Therefore, disengagement of the clutch 106 results in the sprocket 108 being rotated and the chain 112 unwound from the sprocket under the influence of the weight of the frame 92.

Figure 2:
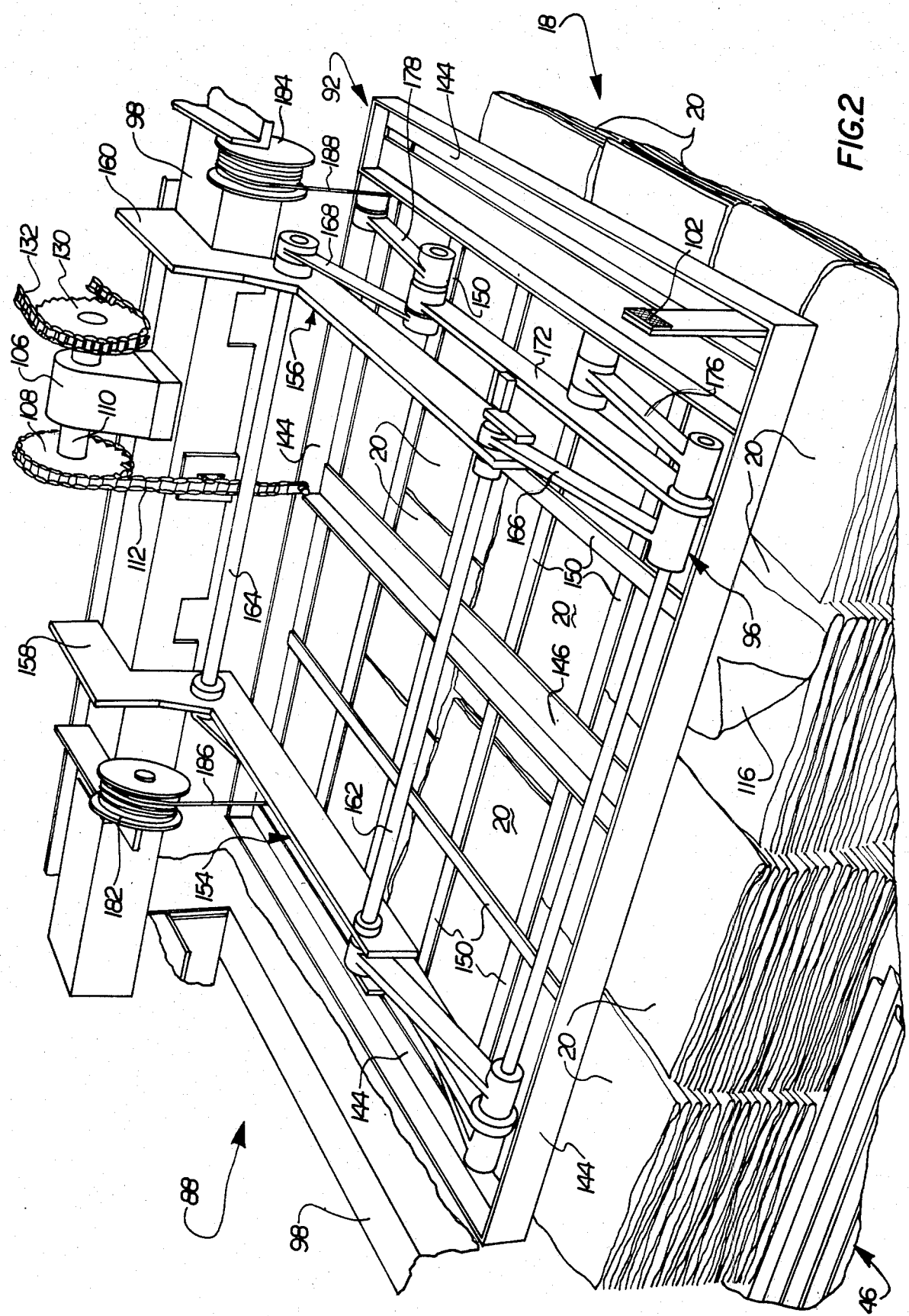
FIG. 2 is a pictorial illustration of a layer position indicator and sheet hold down assembly constructed in accordance with the present invention and forming part of the palletizer of FIG. 1.

As the chain 112 is partially unwound from around the sprocket 108, the frame 92 drops downwardly through a relatively short distance onto the top of the layer 18. Since the frame 92 overlies almost the entire top side of the layer 18, any loose or turned up sheets, such as the sheet 116 in FIG. 2, are pressed firmly downwardly by the weight of the frame. In addition, the bundles 20 in the layer 18 are urged into vertical alignment by the frame 92.

As the frame 92 moves downwardly from the raised position shown in FIG. 3 to the partially lowered position shown in FIG. 4, the linkage 96 maintains the frame 92 in a horizontal orientation. This prevents the frame from being tilted by engagement with upwardly projecting portions of the layer 18 of bundles.

The controller 78 (FIG. 1) then initiates operation of the drive assembly 56 to separate the two sections 52 and 54 of the retractable floor 46. Thus, the section 52 of the retractable floor is moved toward the left (as viewed in FIG. 1) and the section 54 of the retractable floor is moved toward the right. As the sections 52 and 54 of the retractable floor are separated, the bundles 20 of the layer 18 fall downwardly onto the layer 16 of bundles on the pallet 24.

Although it is contemplated that the retractable floor 46 could have many different constructions, in one specific instance, the retractable floor 46 was formed by a plurality of rollers having end portions disposed on a guide track (not shown). The end portions of the rollers were interconnected by a chain which is moved by sprockets of the drive assembly 56 to separate the two sections 52 and 54 of the floor.

As the sections 52 and 54 of the floor separate, the layer 18 of bundles falls downwardly onto the preceding layer 16 of bundles. The preceding layer 16 of bundles is supported by the elevator 58 immediately beneath the retractable floor 46. Therefore, the layer of bundles 18 falls through a relatively short distance through the opening in the floor 46 onto the preceding layer of bundles 16.

Figure 5:
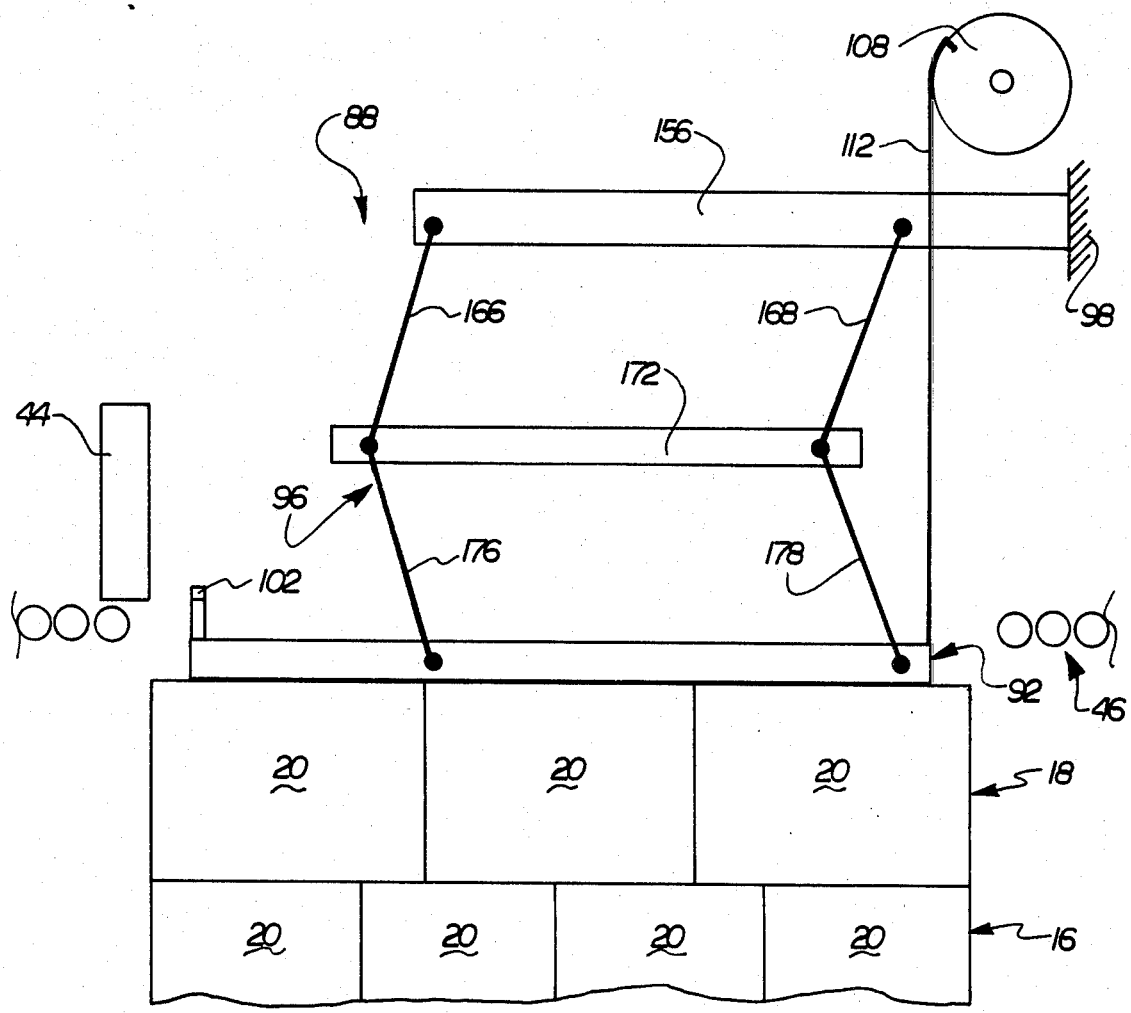
FIG. 5 is a schematic illustration, generally similar to FIG. 4, illustrating the indicator assembly in a lowered position in which the layer of bundles is disposed beneath the retractable floor.

The elevator 58 then lowers the pallet 24 to move the layer of bundles 18 clear of the opening in the floor 46. As the layer of bundles 18 moves downwardly, the indicator frame 92 moves downwardly with the layer. As the frame 92 moves downwardly, the linkage 96 maintains the frame in a horizontal orientation (FIG. 5).

Figure 6:
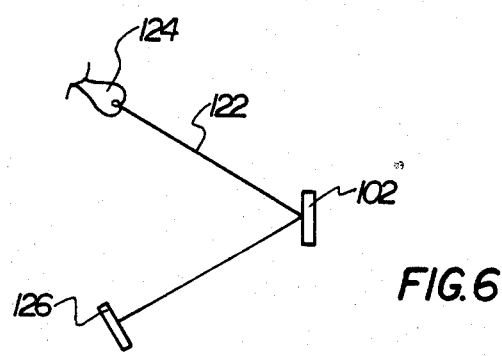
FIG. 6 is a schematic illustration of apparatus for providing a control signal when the indicator assembly is in the lowered position of FIG. 5.

When the layer 18 of bundles has moved to a predetermined position immediately beneath the floor 46, the reflector 102 on the frame 92 moves into the path of a light beam 122 (FIG. 6). The light beam 122 comes from a light source 124 mounted on the main frame 98 of the palletizer 10. The light beam 122 is reflected to a photocell 126 (see FIG. 6) mounted on the main frame 98 by the reflector 102. The output from the photocell 126 is transmitted to the controller 78 to indicate that the layer 18 of bundles has moved downwardly to the desired position immediately beneath the floor 46. It should be understood that although it is preferred to move only the reflector 102 with the indicator frame 92, it is contemplated that either the light source 124 or photocell 126 could be moved with the indicator frame if desired.

Upon receiving a signal from the photocell 126 indicating that the reflector 102 has moved into the path of the light beam 122, the controller 78 stops the operation of the elevator 58. The clutch 106 (see FIG. 2) is then engaged to connect the sprocket 108 with a drive sprocket 130. The drive sprocket 130 is driven by a chain 132 connected with the layer sweep 44. Therefore, when the layer sweep 44 is moved back to engage a next succeeding layer of bundles the chain 132 drives the sprocket 108 through the clutch 106. This causes the chain 112 to lift the frame 92 back to the raised position shown in FIG. 3.

It is contemplated that a portion of one of the bundles of newspapers 20 may project upwardly from the other bundles in the layer of bundles. This could be the result of the manner in which the newspapers are bound in bundles or of tilting of one of the bundles in the stack 22 of bundles. Although a portion of one of the bundles 20 in a layer of bundles may project upwardly further than the other bundles, the entire layer must be moved clear of the opening in the floor 46 before the sections 52 and 54 of the floor are closed to receive the next succeeding layer. If a portion of a bundle 20 projects upwardly into the opening of the floor 46, the bundle could jam the floor in an open position with a resulting malfunctioning of the palletizer 10.

Figure 7:
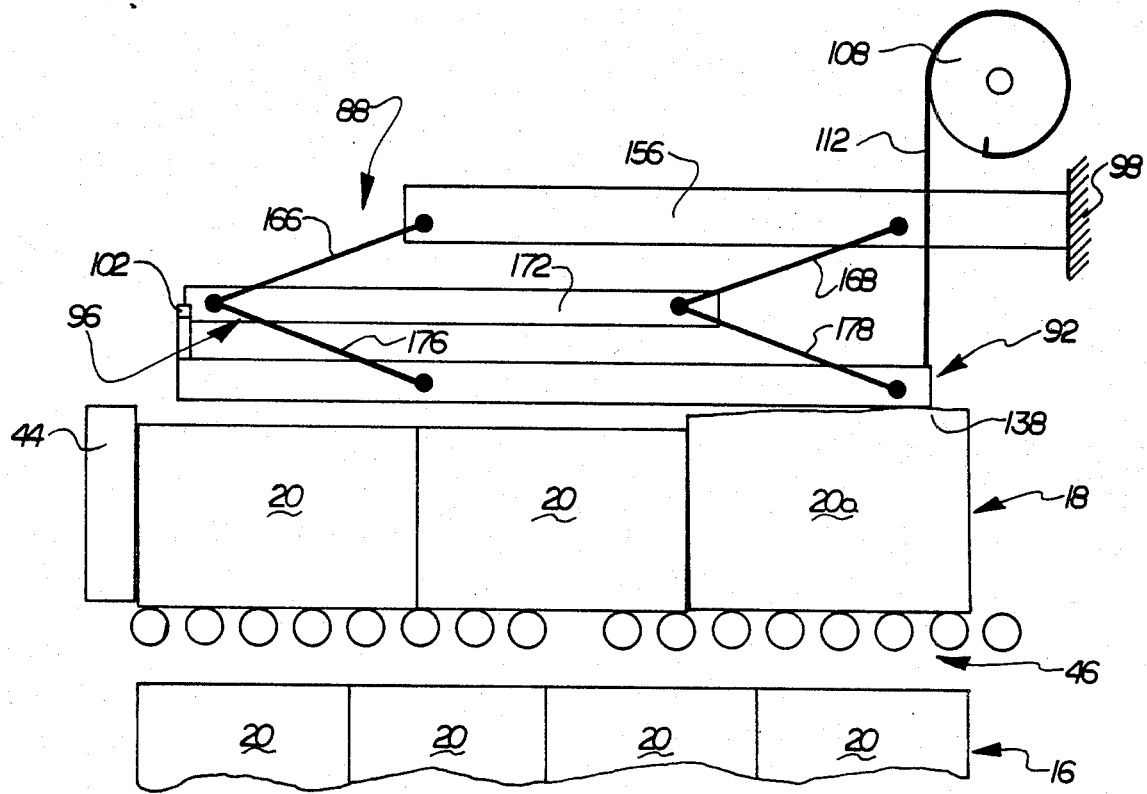
FIG. 7 is a schematic illustration, generally similar to FIG. 4, illustrating the manner in which the indicator assembly engages an upwardly projecting portion of a layer of bundles.

Since the frame 92 overlies substantially the entire top of a layer of bundles and since the linkage 96 maintains the frame in a horizontal orientation, the frame will be held at a height which is determined by the uppermost portion of any one bundle 20 in the layer of bundles 18. Thus, if a bundle 20a in the layer 18 has an upwardly projecting portion 138 (FIG. 7) the frame 92 only moves downwardly only as far as the upwardly projecting portion 138 of the bundle 20a. The linkage 96 holds the frame 92 in a horizontal orientation at a level determined by the extent to which the portion 138 of a bundle 20a projects upwardly. Thus, only a portion of the frame 92 may be in engagement with a layer of bundles 18 while the remainder of the frame is separated from the layer of bundles in the manner shown in FIG. 7.

When the layer 18 (FIG. 7) of bundles is lowered, the frame 92 remains in engagement with the upwardly projecting portion 138 of the bundle 20a. Therefore, the reflector 102 will move into the path of the light beam 122 (FIG. 6) only when the upwardly projecting portion 138 of the bundle 20a is located a desired distance beneath the floor 46.

The layer position indicator and sheet hold down assembly 88 (FIG. 2) has a relatively rugged construction. Thus, the frame 92 includes a plurality of strong side members 144 which are rigidly interconnected. A main or center brace 146 extends between the side members 144. In addition, a plurality of slats 150 are provided to hold down the upper sheets of the bundle 20. Although the frame 92 has been shown as having an open construction, it is contemplated that the frame could be formed by a solid panel if desired.

The linkage 96 is of the double four bar type. Thus, the linkage includes a pair of parallel support arms 154 and 156 (FIG. 2) having end portions 158 and 160 which are fixedly connected to the main frame 98 of the palletizer 10. A pair of cross bars 162 and 164 extend between the support arms 154 and 156. A pair of upper support links 166 and 168 are pivotally connected to the support arm 156. The opposite or lower ends of the links 166 and 168 are pivotally connected with a connector bar 172. A pair of lower support links 176 and 178 are pivotally connected with the connector bar 172 and the frame 92. Although only the linkage arrangement on the right (as viewed in FIG. 2) side of the frame 92 has been described, it should be understood that a similar linkage arrangement is provided on the left side of the frame 92.

In order to reduce the load on the lift chain 112, a pair of counter balance reels 182 and 184 are connected with the frame 92 by wire ropes or cables 186 and 188. The counter balance reels 182 and 184 are provided with substantially constant force springs which cause the reels 182 to tend to wind up the cables 186 and 188.

In view of the foregoing description, it is apparent that a palletizer 10 constructed in accordance with the present invention is operable to sequentially load a plurality of layers 12, 14, 16 and 18 of bundles 20 onto a pallet 24. The palletizer 10 includes a retractable floor 46 which supports each layer of bundles in turn over the pallet 24. Upon opening of the retractable floor 46, the layer of bundles drops through a short distance onto the pallet 24 which is supported by an elevator 58. The elevator 58 then lowers the pallet 24 to move the layer of bundles clear of the opening in the floor 46.

An indicator assembly 88 engages the top of the layer of bundles 20 and moves downwardly with the layer of bundles as it is lowered by the elevator 58 (see FIGS. 4 and 5). When the layer of bundles is a desired distance beneath the floor 46, a sensor detects the position of the indicator assembly 88. The sensor 126 then provides a signal to a control apparatus 78 to stop the operation of the elevator 58.

The indicator assembly 88 includes a frame or panel 92 which overlies a major portion of the top of each of the bundles 20 in the layer of bundles. The frame or panel 92 presses against the layer of bundles to hold down loose sheets of material and to urge the bundles into position in the layer. A linkage assembly 96 holds the frame 92 in a generally horizontal orientation so that the level of the frame is determined by the highest portion of a layer of bundles engaged by the frame.

Having described one specific preferred embodiment of the invention, the following is claimed:

1. An apparatus for sequentially loading a plurality of layers of bundles of newspapers onto a pallet, said apparatus comprising retractable floor means for supporting each layer of bundles in turn over the pallet, said floor means being movable from a closed position supporting a layer of bundles to a retracted position to drop a layer of bundles through an opening in said floor means onto the pallet, elevator means for lowering the pallet with the layer of bundles on the pallet, indicator means for engaging the top of and moving downwardly through the opening in said floor means with the layer of bundles, detector means for detecting when said indicator means has moved to a predetermined position in which the laver of bundles is beneath said floor means when said floor means is in the closed position, and control means for interrupting operation of said elevator means to stop the lowering of the pallet in response to said detector means detecting that said indicator means has moved to the predetermined position, said indicator means including a frame overlying at least a major portion of each of the bundles of newspapers in the layer of bundles and movable downwardly with the layer of bundles through the opening in said floor means, linkage means connected with said frame for maintaining said frame in a horizontal orientation in engagement with the layer of bundles during downward movement of the layer of bundles, said linkage means comprising a first linkage connected with a first side of said frame and a second linkage connected with a second side of said frame, said first and second linkages each including a base, a pair of parallel upper links having upper end portions pivotally connected with the base, a horizontal connector link pivotally connected with lower end portions of said upper links, and a pair of parallel lower links having upper end portions pivotally connected with said connector link and lower end portions pivotally connected with said frame, and lift means connected with said frame at a location between said first and second linkages for raising said frame from a location beneath said floor means to a location above said floor means while said floor means is in the open position.

2. An apparatus as set forth in claim 1 further including sweep means movable from a first position to a second position to push at least a portion of a layer of bundles onto said floor means and drive means for moving said sweep means between the first and second positions, said drive means being connected with said lift means to effect raising of said frame through the opening in said floor means simultaneously with movement of said sweep means from the second position to the first position.

3. An apparatus as set forth in claim 1 wherein said lift means includes a rotatable sprocket, a chain having one end fixedly connected with said sprocket and another end fixedly connected with said frame, and drive means for rotating said sprocket to wind at least a portion of said chain around said sprocket to raise said frame through the opening in said floor means.

4. An apparatus as set forth in claim 3 further including counter balance means connected with said frame for offsetting a portion of the weight of said frame to facilitate rotation of said sprocket by said drive means.

5. A method of loading a layer of bundles of newpapers onto a pallet, said method comprising the steps of positioning a layer of bundles of newspapers on a retractable floor with portions of sheets of the uppermost newspapers in at least some of the bundles free to project upwardly a first distance above the layer of bundles, positioning a pallet on an elevator disposed beneath the floor, retracting the floor to form an opening, dropping the layer of bundles of newspapers downwardly onto the pallet through the opening formed by retracting the floor, operating the elevator to lower the pallet and the layer of bundles of newspapers, detecting when the layer of bundles of newspapers has been lowered to a predetermined level beneath the floor by directing a beam of light from a light source to a photocell when the layer of bundles of newspapers has been lowered to the predetermined level, preventing interruption of the beam of light by a sheet which may project upwardly from one of the bundles of newspapers into the path of the beam of light by holding down the upper sheets in the layer of bundles of newspapers, said step of holding down the upper sheets in the layer of bundles of newspapers includes engaging the upper sheets of each of the bundles of newspapers with a frame on which a reflector is mounted during downward movement of the layer of the bundles of newspapers, said step of directing a beam of light from the light source to a photocell includes directing the beam of light along a path which is partially disposed above the layer of bundles of newspapers by a distance which is less than the first distance which portions of sheets of the uppermost newspapers in at least some of the bundles of newspapers may project upwardly prior to engagement of the upper sheets of the bundles of newspapers with the frame, said step of directing the beam of light along a path including directing the beam of light from a stationary light source to the reflector mounted on the frame and reflecting light from the reflector back to a stationary detector.

* * * * *